United States Patent

[11] 3,615,768

[72] Inventors Milton E. Winyall, Ellicott City,
Thomas E. McGoury, Severna Park,
both of Md., and Julian H. Chaudet,
Fairfax, Va.
[21] Appl. No. 816,033
[22] Filed Apr. 14, 1969
[45] Patented Oct. 26, 1971
[73] Assignee W. R. Grace & Co., New York, N.Y.

[54] DRY REDISPERSIBLE SATIN WHITE AND
METHOD OF PREPARING
8 Claims, No Drawings

[52] U.S. Cl. ............................................. 106/306,
106/308 B, 308 N, 308 Q
[51] Int. Cl. .............................................. C09c 1/02
[50] Field of Search ................................ 106/306,
309, 308 B, 308 Q; 23/122

References Cited
UNITED STATES PATENTS

| 3,494,731 | 2/1970 | Reynolds | 106/308 B |
| 2,345,311 | 3/1944 | Wilson | 106/306 XR |
| 2,435,600 | 2/1948 | Rafton | 106/306 |
| 2,540,182 | 2/1951 | Albert | 106/308 B |
| 2,671,032 | 3/1954 | Thompson | 106/306 |
| 3,494,731 | 2/1970 | Reynolds et al. | 106/306 XR |

FOREIGN PATENTS

| 745,068 | 10/1966 | Canada | 106/306 |

Primary Examiner—James E. Poer
Assistant Examiner—H. M. S. Sneed
Attorneys—Lawrence S. Squires and Kenneth E. Prince ABSTRACT: Drying methods of producing a dried form of satin white which is easily redispersible in liquid carriers, are disclosed. In one aspect the methods are characterized by spray drying under specific temperature conditions. Satin white has utility as a pigment for both paints and paper coatings.

3,615,768

DRY REDISPERSIBLE SATIN WHITE AND METHOD OF PREPARING

BACKGROUND OF THE INVENTION

1. Field of the Invention

This invention relates to methods of drying satin white. A further aspect of this invention relates to methods of forming a dried satin white product which is easily dispersed in liquid carriers.

2. The Prior Art

Satin white is a chemical compound having the approximate chemical formula: $3CaO \cdot Al_2O_3 \cdot 3CaSO_4 \cdot 31-32 H_2O$, which finds extensive commercial use as a pigment, particularly in paints, paper and paperboard coatings. Because of its bright white color and because it generally possesses good coating properties, e.g. gloss, brightness, opacity, smoothness and ink receptivity, it is extensively used as a paper coating pigment. Satin white is typically prepared by reacting aqueous solutions of alum with aqueous dispersions of quick lime or slaked lime in amounts stoichiometrically equivalent to their ratio in the satin white composition. It has also been found that by varying the reaction conditions, the size and shape of the satin white particles formed can be varied and consequently also its gloss, smoothness, whiteness and hiding power, which are largely a function of particle size and shape.

Satin white is typically prepared, and used, in the form of an aqueous slurry having a satin white solids content of from 20 to 35% and preferably from 25 to 30% by weight. One of the problems incident to satin white, is that it cannot be satisfactorily redispersed after it has been dried. Thus the satin white pigment must be either prepared at the job site, e.g. paper mill, or must be shipped in the form of an aqueous slurry having a satin white solids content of 20 to 35% by wt. This necessarily increases the shipping costs due to the large amount of water which must be shipped with the satin white. Thus it would be very desirable to develop a method of drying satin white in a form which is readily liquid disperable and thus avoid the excessive shipping costs or the necessity for preparing the satin white at the job site. The prior art has also recognized this problem and has attempted to develop methods, of alleviating this dispersion problem, such, as for example, that described in U.S. Patent 2,671,032, which requires intimately mixing a protein material with satin white followed by the addition of a hydrated alkali metal phosphate. This method necessarily increases the cost of the ultimate product and does not represent a complete solution to the problem.

OBJECTS AND SUMMARY

Objects

It is therefore an object of the invention to provide improved methods and means for drying satin white and to provide an improved dried satin white product. It is a further object of the invention to provide methods and means for spray drying satin white and to provide a dried form of satin white which is readily dispersible.

It is a still further object of the invention to provide methods and means for spray drying satin white and to provide a form of dry satin white which is readily dispersible in a liquid medium, such as for example water, and which has a particle size and shape particularly desirable for use in paper coatings.

Additional objects will be apparent, and in part obvious, from the following description and the appended claims.

SUMMARY

These and other objects can be accomplished by our invention the process of which, in summary, comprises the steps of:

(1) providing a satin white slurry, preferably an aqueous slurry, having a solids content of about from 5 to 11% by wt.
(2) adding a suitable dispersant to the satin white slurry in a quantity equal to about from .6 to 2.5% by wt. based on the weight of solid satin white in the slurry.
(3) spray drying the diluted slurry containing the dispersant in a spray drier using, countercurrent flow, a heating gas inlet temperature in the range of about from 650° F. to 750° F. and controlling the flow rate of the heating gas, relative to the rate of the diluted slurry being fed into the spray drier, such that the heating gas has an outlet or exit temperature in the range of about from 250 to 350° F. We have found particularly good results to be obtained using air as the heating gas.

Typically the slurry will be at ambient temperatures, when it is fed into the spray drier though other temperatures can be used. The characteristics of spray driers are such that by supplying the heating gas to the spray drier at a specific temperature (or temperature range) and then controlling the outlet temperature of the heating gas by adjusting the flow rate of the heating gas, the satin white is subjected to, within narrow limits, a particular drying temperature – time profile, which results in the production of a dried product which is easily dispersible in liquid mediums, such, as for example, water. We have also found that if the temperature limits are not maintained the resulting satin white product will not satisfactorily disperse in liquid carrier mediums, typically water, and/or will not be satisfactorily dried. In contrast to this, the dried satin white product of our invention, disperses readily in liquid carriers, and typically has a particle size in the range of about from 0.1 to 0.3 microns wide, and about from 1.0–3.0 microns long. By readily dispersible in liquid mediums we mean that when the dried satin white product of our invention is added to water containing from about 1.75% to 2.5% dispersant, based on the weight of the satin white, and mixed in a Waring Blender, as much as 25% satin white, based on total weight of mixture, can be brought into a stable dispersion suitable for subsequent formulation into a paper coating dispersion. Suitable dispersants include, for example, sodium polyacrylate and tri-sodium nitrilotriacetate, and the like. The suitability of the dispersion for paper coating is judged by making a draw-down of the dispersion on a glass plate. An unsatisfactory dispersion will be shown by this type to possess a large number of agglomerates.

DETAILED DESCRIPTION OF THE INVENTION AND PREFERRED EMBODIMENTS

Considering now our invention in greater detail a slurry of satin white having a satin white solids content ob about from 5 to 11% by wt. is prepared. Typically this slurry is prepared by merely diluting a commercial satin white slurry or the satin white slurry reaction product obtained from a typical process used for preparing satin white, to the desired 5 to 11% solids content. Typically, the satin white is prepared and is commercially available in the form of a slurry having a solids content of about from 20 to 35% by wt. Also the liquid carrier medium usually will be water though other suitable carrier could be used. The actual preparation of the satin white compound itself is well known to the art and does not form part of our invention; suitable methods for preparing satin white can, for example, be obtained from U.S. Patent Nos. 2,310,693; and 3,391,995. We have further found that best spray drying results are obtained by using slurry solids contents of about from 5 to 6% by wt.

The next step of our process comprises admixing the dilute satin white slurry with about from .6 to 2.5% by wt. (based on the weight of the solid satin white in the slurry) of a suitable dispersant. Suitable dispersants, for example, include sodium hexametaphosphate, sodium polyacrylate, trisodium nitrilotriacetate, and the like and mixtures thereof. We have found particularly good results to be obtained by using a sodium hexametaphosphate type dispersant, which has a $Na_2O$ to $P_2O_5$ ratio of 1.1:1 and contains at least 65% by wt. $P_2O_5$, sold under the trademark Calgon; especially when used at a concentration of about .6 to 1% by wt. (based on the wt. of satin white).

In the next step of our process, the diluted satin white slurry containing the admixed dispersant is spray dried under carefully controlled temperature conditions. Preferably the dispersant is thoroughly mixed with the satin white slurry prior to spray drying.

In the operation of a typical spray drier, a slurry of the material to be dried, is sprayed into a chamber into which a heating gas is flowing. The flow of heating gas can be either countercurrent or cocurrent to the direction of flow of the slurry spray. The liquid portion of the slurry is rapidly evaporated from the slurry, leaving the dried product which is then collected. The details of the operation of spray driers are well known to the art, and further information as to these details can, for example, be obtained from the following U.S. Patent Nos. 3,049,174; and 3,110,444. As noted above, the spray drier can be operated with either cocurrent or countercurrent flow of the heating gas and slurry, however we have found best results to be achieved, in our process, using countercurrent flow. Therefore the temperatures range which herein follow will be for countercurrent flow and suitable adjustments will be required for cocurrent flow to give effectively the same temperature profile effect. This can be obtained by routine energy balance calculations and optimization tests, well within the scope of an artisan. It is critical to our invention that the heating gas be supplied at an inlet temperature of about from 650° F. to 750° F. and that the rate of the heating gas flow be adjusted such, relative to the flow of the slurry, that the outlet or exit temperature of the heating gas is in the range of about from 250 to 350° F. We have found that best results are obtained when the heating gas is supplied to the spray drier at an inlet temperature of about 700° F. and the flow rate of the heating gas adjusted such, that the outlet gas has a temperature of about 300° F. Typically, and conveniently, the heating gas will be air, though other gases can be used, provided they do not react with the satin white or dispersant, or are not otherwise deleterious to the satin white product. The above heating gas temperatures have been based on air, thus where other gases are used having different heat capacities a modification in the temperature differentials between the inlet temperature and exit temperature will be required to account for this difference. The dried satin white product will typically have an ultimate temperature around 105° C., which is the temperature at which satin white begins to lose its water of hydration. The important factor being that the spray dried product retains a portion of its water of hydration or crystallization.

Because of the nature of spray drying operation and of the hydrated satin white, the specification of the inlet and outlet temperature of the heating fluid is completely definitive of the critical time temperature relationship or profile to which the satin white is subjected during drying. It is theorized that this time temperature profile is such that the satin white is sufficiently dried to become a dry powder and yet still retains a substantial portion of its water of crystallization and that liquid dispersibility of the dried product is at least partially attributable to this substantial retention of the water of crystallization. Best results are obtained when about 25% of the water of crystallization is retained. The spray dried product has a particle size in the range of about from 0.1 to 0.3 microns wide and about from 1.0 to 3.0 microns long, which is especially desirable for use in paper coatings.

After the satin white has been spray dried it can be shipped to the job location in the dry form and then redispersed at the job site. The redispersion is accomplished by simply mixing the satin white with the desired quantity of the desired liquid medium carrier, usually water. Best results are obtained when the dried satin white is mixed with a small amount of dispersant typically about .5–2% based upon the wt. of satin white, though this is unnecessary where sufficient dispersant has been added prior to spray drying. Suitable dispersants have been previously described. A typical dispersion, used in a paper coating preparation will have a solids content of about from 20–30% by wt.

A further understanding of the invention can be had from the following illustrative, but non-limiting, examples.

Example 1

This example illustrates a method of preparing satin white. In this example satin white was prepared as follows: a 560 g. portion of quicklime (98% CaO) was slaked in 1500 g. boiling water in a jacketed mixer (Model C–100T Hobart Mixer). After cooling to 20° C. by circulation of cold water in the jacket, there was added a solution of 990 g. aluminum sulfate $[Al_2(SO_4)_3 \cdot 18 H_2O]$ dissolved in 3225 g. water. This solution was added with stirring over a period of 42 minutes, during which time the reaction mixture reached a maximum temperature of 30° C.

At the end of the reaction the mixture had a pH of 11.4 and a solids content of 34.2%. Chemical analysis of the vacuum dried product showed:

|  | Mole Ratio |
| --- | --- |
| CaO | 6.28 |
| $Al_2O_3$ | 1.00 |
| $SO_3$ | 3.32 |
| $H_2O$ | 29.0 |

Example 2

This example illustrates a method, according to our invention, of preparing a spray dried liquid dispersible satin white product. In this example an aqueous slurry having a satin white solids content of 35% by wt. was diluted with sufficient water to form a slurry having a solids content of about 5% by wt. The slurry was then passed to a conical type spray drier (designated and sold by Boeing Engineering, Inc., of North Brook, New Jersey, as Model BE–499–Conical Laboratory Type) at the rate of 5 gal. per min. Heated air was supplied to the spray drier, using countercurrent flow, at an inlet temperature of 700° F. The flow rate of the heated air was adjusted such that the outlet temperature of the air was maintained at 300° F. The resulting product was a fine white powder. This powder is mixed with 1.75% (based on the wt. of satin white) of sodium polyacrylate and is mixed with water to prepare a dispersion having a 25% by wt. solids content. The dispersion is found to be very satisfactory and suitable for use in formulating paper coating.

Example 3

This example illustrates a method, according to our invention of preparing a spray dried liquid dispersible satin white product. In this example a commercial satin white slurry, sold by Hercules Powder Co. under the trademark Hercules Super Satin White Paste, having a 25% by wt. solids content in a water carrier, was diluted with water to a 5% by wt. solids content and then mixed with 1% by wt. (based on the weight of dried satin white) of a dispersant sold under the trademark Calgon. The slurry was then spray dried in the same manner as in Example 2. The resulting product is again a white powder which was easily dispersible in water under the same conditions as in Example 2.

Example 4

In this example the dried satin white products of Examples 2 and 3 were dispersed in water and were respectively compounded with identical quantities of the same paper coating ingredients, into three paper pigment coatings. The ultimate pigment coatings had the following composition, in terms of parts by weight, 100 parts satin white, 40 parts starch, 2.5 dispersant (sodium salt of polyacrylic acid) and 300 parts of water. The coatings were then applied to identical paper samples at a coating level of 10#/3300 ft.² and the resulting coated paper tested for gloss, brightness, opacity, smoothness and ink receptivity according to the following TAPPI Tests:

| Test | Method |
|---|---|
| Brightness | TAPPI T452 M-58 |
| Opacity | TAPPI T425 m-60 |
| Gloss | TAPPI T480 ts-65 |
| Smoothness | TAPPI T490 sm-58 |
| Ink Receptivity | TAPPI Routine Control Method No. 19 |

Identical paper pigment coatings were made, but using the initial forms of the satin white pastes prior to spray drying. These coatings were then applied to samples of papers identical to those used for the spray dried pigment coating, and the same manner as the spray dried pigment coatings. These papers were then tested in the same manner as those coated with the spray dried satin white. The results of these tests are summarized in the following table.

TABLE

|  | Example 3 | | Example 2 | |
|---|---|---|---|---|
|  | As rec'd.[1] | Spray dried | As rec'd.[2] | Spray dried |
| Solids | | 5 | | 5 |
| Dispersant | | 1.0% Calgon | | 0.6% Calgon |
| Rate (gph) | | 5 | | 5 |
| Inlet temp. (° F.) | | 600 | | 600 |
| Outlet temp. (° F.) | | 300 | | 300 |
| Coating properties: | | | | |
| Gloss | 59 | 60 | 59 | 61 |
| Brightness | 84 | 86 | 87 | 86 |
| Opacity | 89 | 90 | 90 | 90 |
| Smoothness | 750 | 460 | 430 | 480 |
| Ink receptivity | 61 | 64 | 66 | 63 |

[1] Hercules Powder.
[2] Davison Experimental.

Example 5

In this example a sample of the satin white prepared according to Example 1 is diluted with water to a solids content of 5% by wt. The dispersant Calgon is then admixed with the slurry in a quantity equal to 1% by wt. of the solid satin white content of the slurry. The slurry is then dried in an oven at a temperature of 50° C. until the product is dried. When tested for its ability to disperse in water the dried material is observed to form agglomerates rather than the desired dispersion.

Example 6

In this example the same procedure of spray drying is followed as in Example 3 with the exception that the material is spray dried using an inlet air temperature of 800° F. and an outlet air temperature of 400° F. The resulting product is found not to be satisfactorily dispersible in water, but instead forms agglomerates.

From the above examples it can be seen that the coating properties of the satin white dried according to our invention is virtually equivalent to that of the initial undried paste. Also where the satin white is oven dried or spray dried without following the temperature control conditions of our invention, the resulting product is not satisfactorily dispersible in water.

Obviously many modifications and variations of the invention, described hereinabove and in the appended claims, can be made without departing from the essence and scope thereof.

We claim:

1. A method of drying satin white, to form a dried product which is easily redispersible in water, which comprises the steps of:
    (a) preparing a slurry of satin white having a solids content of about from 5 to 11% by wt.,
    (b) admixing a sufficient quantity of a dispersant selected from the group consisting of sodium hexametaphosphate, sodium polyacrylate, trisodium nitrilotriacetate and mixtures thereof, with said slurry to provide a dispersant concentration of about from .6 to 2% by wt., based on the weight of the solid satin white in said slurry,
    (c) spraying said slurry using countercurrent heating gas flow and a heating gas inlet temperature of about from 650° F. to 730° F. and controlling the rate of flow of said heating gas such that the heating gas will have an exit temperature of about from 250 to 350° F., whereby said satin white is dried to a dry powder while still retaining a substantial portion of its water of crystallization,
    (d) collecting and recovering the dried redispersible satin white powder from said spray drier.

2. The process of claim 1 wherein said heating gas inlet temperature is about 700° F. and wherein the heating gas flow rate is controlled such that the exit temperature of the heating gas will be about 300° F.

3. The process of claim 2 wherein said dispersant is provided in a concentration of about from .6 to 1% by wt., based on the wt. of the solid satin white, and wherein said dispersant is sodium hexametaphosphate containing at least 65% by wt. $P_2O_5$ and having $Na_2O$ to $P_2O_5$ ratio of about 1.1 to 1.

4. The process of claim 1 wherein said slurry is supplied to the spray drier at ambient temperatures.

5. The process of claim 1 wherein said heating gas is air.

6. The process of claim 1 wherein said slurry is an aqueous slurry.

7. The process of claim 3 wherein said heating gas is air.

8. The dried redispersible satin white product produced by the process of claim 1.